INVENTORS
Ulrich Jannasch &
Günter Schmidt

BY Spencer & Kaye

ATTORNEYS

United States Patent Office 3,544,222
Patented Dec. 1, 1970

3,544,222
OPTICAL INSTRUMENT FOR DETERMINING LAYER THICKNESS
Ulrich Jannasch, Cologne-Ostheim, and Gunther Schmidt, Cologne-Bayental, Germany, assignors, by mesne assignments, to Leybold-Hochvakuum-Anlagen GmbH, Cologne-Bayental, Germany
Filed Oct. 12, 1967, Ser. No. 698,996
Claims priority, application Germany, Oct. 13, 1966, L 54,802
Int. Cl. G01b 11/00; G01n 21/48
U.S. Cl. 356—161   10 Claims

ABSTRACT OF THE DISCLOSURE

An optical instrument for measuring the reflectivity or transparency of a layer in order to produce a continuous indication of the thickness of the layer as it is being formed during a vapor deposition process, the instrument including an arrangement for directing a narrow light beam onto a surface of the layer and an indicator system having two substantially identical light-sensitive elements and two parallel light paths, one for each light-sensitive element, only one light path being arranged for receiving the refected or transmitted light beam, while both light-sensitive elements receive an identical amount of extraneous or ambient light, so that the difference in response between the two light-sensitive elements provides an indication of the degree to which the light beam is reflected or transmitted by the layer being measured.

BACKGROUND OF THE INVENTION

The present invention relates to an optical instrument for measuring the thicknesses of layers in vacuum-deposition processes wherein the measuring light beam coming from a measuring light source is reflected from such a layer and the reflected beam is received by an indicator.

It is known that the thickness of vacuum-deposited layers has previously been monitored by measuring resistance of the vapor-deposited layer. The damping of oscillator crystals is further used to obtain such a measurement. It is also known, moreover, to use a measurement of the influence exerted by the vapor-deposited layer on the intensity of a light beam as a measuring value. The first two methods do not directly measure the vapor-deposited layer itself, the measurement is rather carried out on a measuring substrate disposed adjacent to the layer. The optical measurement of the thickness of the layer, however, has the advantage that no contact is made to the layer being measured so that the layer is not subjected to any external influences while being vapor-deposited.

In the conventional methods of optically measuring the thickness of a layer, the optical measuring apparatus is disposed externally of the vacuum container and the measuring beam is directed onto the layer to be measured through a glass crucible or through a glass window and into the container. Such a technique is subject to inherent measuring errors due to the fact that the glass portion of the container will become fogged by vapors resulting from the depositing process and/or the measuring light beam entering the container will be influenced by reflection from the glass surfaces even before it impinges on the vapor-deposited layer. These errors are not corrected by the conventional methods.

The problem further arises of separating, at the indicator, the measuring light from possible fluctuating extraneous or ambient light. This separation was previously accomplished by modulating the measuring light with a fixed frequency and by employing a tuned amplifier tuned to this frequency.

The previously known measuring methods have the further disadvantage that they are limited to use with objects which are statically mounted in the vacuum container so that during one working process only one object can be vapor-deposited and measured at the same time.

SUMMARY OF THE INVENTION

It is a primary object of the present invention to eliminate these drawbacks and difficulties.

Another object of the present invention is to detect the reflectivity of a surface with improved accuracy.

Yet another object of the invention is to eliminate the influence of extraneous light from the reflected light reading.

Still another object of the invention is to carry out such a measuring operation with apparatus disposed entirely within the enclosure containing the object whose surface is to be measured.

These and other objects according to the present invention are achieved by an optical measuring instrument for optically determining the thickness of a coating being deposited on at least one object disposed in a deposition enclosure, which instrument includes a measuring light source for directing a light beam onto the surface of such layer and a light detecting system arranged for receiving the beam after it impinges on such surface and for producing an indication of the received beam brightness. The present invention includes the improvements wherein: both the light source and the detecting system are disposed within the enclosure; the detecting system is arranged for eliminating from the beam brightness indication the effects of all received light other than that of the beam; and the instrument is arranged for measuring layers on stationary or rotating objects.

The operation of the instrument for measuring layer thicknesses according to the present invention involves a measurement of the intensity of a measuring light beam after it has either been reflected at the surface of the layer or penetrated this layer. The light absorption by a vapor-deposited layer can be determined by the attenuation of the measuring light beam as it passes through the layer. For this purpose the measuring light source can either be disposed directly above the layer or the measuring light beam can be directly through the layer with the aid of an auxiliary mirror. For electrically conductive layers, which are made of metallic reflecting layers, the component of the light beam reflected at the layer surface is measured.

In order to be able to determine the absolute value of the layer thickness from such a relative measurement, it is necessary to relate the layer thickness to the degree of reflection based on calibration curves established for the particular layer material. By an analogous procedure, the thickness of a layer can be determined from its degree of light absorption. With layers of dielectric material, which are transparent to some degree, alternating maxima and minima occur in the transmitted light intensity with increasing layer thickness as a result of the occurrence of interference. Thus, the required layer thickness can be determined with a high degree of accuracy by counting the number of cyclic fluctuations in the measuring indication.

DESCRIPTION OF THE PREFERRED EMBODIMENTS

Figure 1:
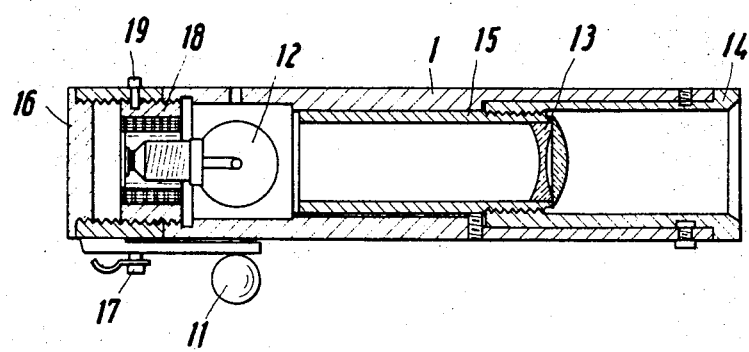
FIG. 1 is a cross-sectional view of the measuring light source of one embodiment of the present invention.

FIG. 1 shows a measuring light source 1 which can be pivotally mounted, by means of a ball joint 11, within a vacuum container. A light source 12 is disposed within member 1 and light passes from this source through an optical focussing system 13 and leaves member 1 in the form of a concentrated beam through the right-hand, open end thereof. The body portion 14 of member 1, which is disposed beyond the optical focussing system 13, serves as a shield against the vapor stream produced during the vapor-depositing process. Within member 1 an adjustment device 15 is disposed for moving the optical system 13 longitudinally so that the image of the light source 12 can be focussed at a predetermined distance. The other end of member 1 is closed by a cover 16 which can be removed to permit access to the light source 12. A clamping device 17 is disposed at the other end of member 1 and serves to hold, and relieve the tension on, the electrical supply line (not shown) of light source 12. The light source 12 is disposed in a holder 18 which can be removed through the open cover 16 and which is held in its assembled position by a clamping screw 19.

The optical focussing system gives the measuring light beam traveling to the layer to be measured a small cross section after it leaves the measuring light source and the beam then reaches the indicator in this form. The focussing also increases the efficiency of light utilization and makes it possible to carry out measurements on small objects.

In further accordance with the present invention, the separation of the measuring light from the ambient light can be achieved by providing at least two light-sensitive elements, or indicators, which are combined into a system. In this case the first indicator receives the incoming measuring light beam together with the existing ambient light. The second indicator only receives the ambient light. By comparing the two resulting indicator outputs, an exact determination of the resulting layer thickness can be produced. Furthermore, arranging the indicators as a compact system facilitates installation into the vacuum container.

A further advantageous feature of the present invention is that the measuring light beam passes through a monochromatization device before reaching the light-sensitive components which effect the light measurement. This arrangement allows only monochromatic light of a definite wavelength to reach the light-sensitive components and thus compensates for any color dependency in the optical effect of the layer being measured.

A suitable further development of the present invention consists in that an additional light source is associated with the indicator system. This light source permits the light-sensitive components to be biassed into their most favorable operating range for performing the measurements.

Figure 2:
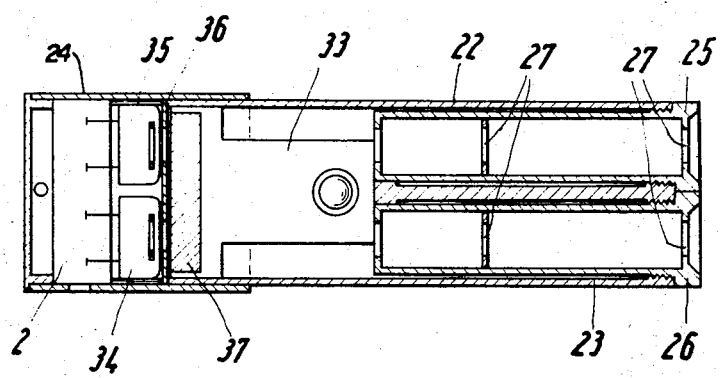
FIG. 2 is a cross-sectional plan view of the indicator system of one such embodiment.
Figure 3:
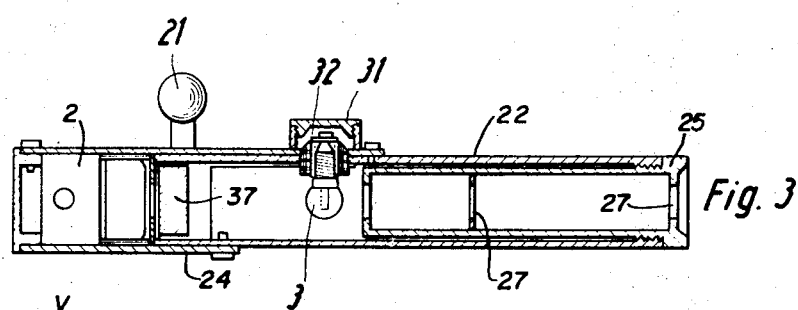
FIG. 3 is a cross-sectional elevational view of the indicator system of FIG. 2.

FIGS. 2 and 3 show such an indicator system, which can be pivotally mounted in the vacuum container by means of a ball joint 21, which can be seen in FIG. 3. Two tube portions 22 and 23 are disposed in parallel fashion within the body 2 of the indicator system. The tube portions 22 and 23 are connected at their inner ends to a sheath 24. Within the tube portions 22 and 23 diaphragm holders 25 and 26 are screwed in and various diaphragms 27 forming light passages are disposed therein. A light source 3 is disposed behind the diaphragm holders 25 and 26 in the wall of body 2, which light source is disposed midway between the centerlines of holder 25 and 26 and is accessible through an aperture 32 provided with a cover 31. The light source 3 is held by a cover plate 33 which is rigidly connected to sheath 24.

Photoconductive cells 34 and 35 are disposed behind, and in line with, the tube portions 22 and 23, respectively, and are embedded in a pocket-like support 36 screwed into the sheath. In front of the photoconductive cells 34 and 35 a monochromatization device 37 is disposed so as to extend across the light receiving openings for both indicator cells. The photoconductive cells 34 and 35 and the light source 3 are connected, via a duct in the sheath 24 (connections not shown) to a net current measuring instrument which is disposed externally of the vacuum container and which is arranged to provide an indication of the current difference between the outputs of cells 34 and 35.

The instrument to measure layer thicknesses operates in the following manner:

The measuring light source 1 and the indicator system 2 are fastened, for measuring reflected light, in suitable mounts to the bottom plate of a vapor-depositing device, by means of ball joints 11 and 21, respectively, in such a manner that the light coming from the measuring light source 1 is reflected from the object to be covered by vapor-deposition and reaches only one of the photoconductive cells 34 or 35 after passing through the openings in diaphragms 27 and the monochromatization device 37. Both cells of system 2 generally pick up equal portions of extraneous or ambient light from the vapor-deposition apparatus or from the area outside of the vacuum container. For detecting light transmitted through the layers, source 1 and indicator 2 can be disposed to, respectively, opposite sides of the layers or a mirror can be provided for reflecting the beam from source 1 onto the layer.

The photoconductive cells 34 and 35 are preferably connected in different arms of a measuring bridge. An identical change in intensity of the light beam at both photoconductive cells 34 and 35 therefore will not noticeably influence the current between two diagonal terminals of the measuring bridge. Since the measuring light, i.e., the light emitted from unit 1 and reflected by the surface being monitored, acts only on one of the cells, a change in the intensity of this reflected light will cause a change in the diagonal current of the bridge. The measuring sensitivity of this arrangement is essentially dependent on two parameters: the bridge supply votlage and the brightness of the measuring light.

When photoconductive cells are utilized as the light-sensitive components, it is desirable to connect the bridge in such a way that the diagonal current of the measuring bridge is used as the measuring signal. This circuit has the advantage that the entire system can be adjusted to produce an initial zero output at which no measurable current flows in the measuring portion of the instrument. This thus eliminates, because of the great sensitivity of the circuit, the need for an expensive measuring amplifier.

Figure 4:
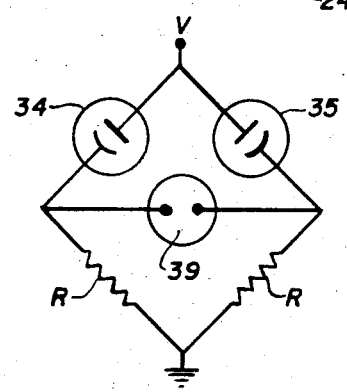
FIG. 4 is a circuit diagram of one type of measuring bridge that can be used in embodiments of the present invention.

FIG. 4 shows one such bridge arrangement in which the elements 34 and 35 have their outputs connected to form two adjacent arms of the bridge. The other two arms of the bridge are constituted by matched resistors R. Between two bridge diagonals, a supply voltage V is provided, while a current measuring instrument 39, which can be a galvanometer, is connected between the other two diagonals so as to produce an indication corresponding to any imbalance in the output parameters of elements 34 and 35.

A particular advantage of the measuring instrument according to the present invention is that the instrument will respond correctly to the measuring beam even if the beam experiences regularly recurring brief interruptions since a tuned amplifier is not required in the present arrangement. Thus it is possible for the firt time to economically measure rotatingly mounted objects during a vacuum deposition process.

The calibration of the device is effected as follows:

The reading corresponding to zero percent reflection is determined by blocking or turning off the measuring light beam from source 1 and the measuring bridge is set to a zero reading for this value. A galvanometer serves as indicating instrument. A second measuring point is defined by mounting an object having a known degree of reflection on the object holder and restoring the measuring light beam. The amount of reflection corresponding to the calibration level of this object is set on the measuring instrument by adjustment of the brightness of the measuring source 1. With this adjustment process, which can occur under atmospheric pressure as well as under vacuum, a complete calibration of the system is achieved.

The measuring range between 0 and 100% reflection is preferably divided into four areas on the measuring instrument starting from the set zero point.

When an area is to be covered by vapor-deposition to provide a layer having a predetermined degree of reflection, it is mounted—as described—on the object holder and, after the vacuum required for this process has been created, is subject to the vapor-deposition process until the measuring instrument produces an indication corresponding to the desired degree of reflection.

To measure objects disposed above the vaporization source, it is advisable to place the vaporizer between the measuring light source 1 and the indicator system 2.

If the object holder is constructed in the form of a disc or a cupola on which several objects are approximately equidistantly spaced for rotation above the vaporizer, the location of the measuring light source 1 and the indicator system 2 is independent of the location of the vaporizer since an object requires only a short time during its rotation to traverse the path from the vaporizer to the measuring system. It is herein advantageous to select the rotational speed so that the time interval between the objects to be measured only slightly exceeds $\frac{1}{30}$ second. Under such conditions, the measuring instrument furnishes a smooth, continuous measuring signal at the galvanometer as well as at outputs provided for connection of a potentiometer recorder.

For all measurements, the intensity of light source 3 is adjusted to illuminate both photoconductive cells by a sufficient amount to bring them into the most favorable low-ohmic range for measuring purposes. Thus the measurement occurs over an almost linear characteristic range and short recovery periods for the photoconductive cells are realized.

It will be understood that the above description of the present invention is susceptible to various modifications, changes and adaptations, and the same are intended to be comprehended within the meaning and range of equivalents of the appended claims.

We claim:

1. In an optical instrument for optically determining the thickness of a layer being deposited on at least one object disposed in a deposition enclosure, which instrument includes a measuring light source for directing a light beam onto the surface of such layer and a light detecting system arranged for receiving the beam after it impinges on such surface and for producing an indication of the received beam brightness, the improvement wherein:

(a) both said light source and said detecting system are disposed within the enclosure;

(b) said detecting system is arranged for eliminating from the beam brightness indication the effects of all received light other than that of the beam and comprises two light-sensitive elements and two light passages each associated with a respective element, said two passages being disposed parallel to, and adjacent, one another and only one of said passages being positioned for permitting the passage of the received light beam to its associated sensitive element; and (c) said instrument is arranged for measuring layers on stationary or rotating objects.

2. An arrangement as defined in claim 1 wherein said light source comprises an optical focussing system for concentrating the beam into a small cross section.

3. An arrangement as defined in claim 1 further comprising a monochromatization device disposed in front of both of said light-sensitive elements.

4. An arrangement as defined in claim 1 wherein said detecting system further comprises an aditional light source having a controlled brightness and positioned for equally influencing both of said light-sensitive elements.

5. An arrangement as defined in claim 4 wherein the amount of light from said additional source is adjusted for causing said light-sensitive elements to operate over a substantially linear portion of their light-responsive characteristic.

6. An arrangement as defined in claim 1 wherein each of said light-senstive elements is connected into a respective arm of a measuring bridge, which bridge produces a current flow between two diagonal terminals which is a measure of the intensity of the beam arriving at said detecting system.

7. An arrangement as defined in claim 6 wherein said elements are photoelectronic devices.

8. An arrangement as defined in claim 6 wherein said elements are photovoltaic cells.

9. An arrangement as defined in claim 6 wherein said light source is arranged relative to said detecting system for permitting said system to receive the beam after it passes through such layer.

10. An arrangement as defined in claim 6 wherein said light source is arranged relative to said light detecting system for permitting said system to receive the beam after it is reflected from such surface.

References Cited

UNITED STATES PATENTS

| | | | |
|---|---|---|---|
| 3,322,962 | 5/1967 | Muller | 250—219 |
| 3,395,278 | 7/1968 | McDivitt | 356—161 X |

RONALD L. WIBERT, Primary Examiner

P. K. GODWIN, Assistant Examiner

U.S. Cl. X.R.

356—156, 201, 202, 204, 206, 212